United States Patent

Kim

Patent Number: 5,505,123
Date of Patent: Apr. 9, 1996

[54] NUT CRACKING APPARATUS

[76] Inventor: Sun Y. Kim, 2384 Lancaster Ct., Hayward, Calif. 94542

[21] Appl. No.: 490,017

[22] Filed: Jun. 12, 1995

[51] Int. Cl.⁶ .................................................. A23N 5/00
[52] U.S. Cl. ................................ 99/579; 99/568; 99/581
[58] Field of Search ........................ 99/568–583, 609, 99/610, 625–628; 426/482; 241/6, 7, 252; 100/158; 30/120.1, 120.2

[56] References Cited

U.S. PATENT DOCUMENTS

| | | | |
|---|---|---|---|
| 1,208,324 | 12/1916 | Jones | 99/579 |
| 1,543,797 | 6/1925 | Sciortino | 99/579 |
| 1,698,620 | 1/1929 | Clark | 99/579 |
| 2,285,355 | 6/1942 | Pricer | 99/581 |
| 2,296,088 | 9/1942 | Carter | 99/579 |
| 2,339,596 | 1/1944 | Wright | 99/579 |
| 4,201,126 | 5/1980 | Evans | 99/574 |
| 4,603,624 | 8/1986 | Greenblatt | 99/572 |
| 4,793,248 | 12/1988 | Frederiksen et al. | 99/575 |
| 5,115,733 | 5/1992 | Frederiksen et al. | 99/580 |
| 5,247,879 | 9/1993 | Frederiksen et al. | 99/581 |
| 5,361,688 | 11/1994 | Blankenship | 99/572 |

*Primary Examiner*—Timothy F. Simone
*Attorney, Agent, or Firm*—Bielen, Peterson & Lampe

[57] ABSTRACT

Nut cracking apparatus including a cracking machine with first and second opposed cracking plates with pivot means for suspending one of the plates from a pivot axis substantially parallel to and spaced from the pivot axis of the other suspended plate, the suspended plates being interconnected at the bottom of each plate by a link mechanism having a release, so that the plates are suspended with the spacing between the plates at the top of the plates being greater than the spacing at the bottom of the plates, the machine having a reciprocal drive mechanism that swings the plates together to a cracking position where the plates are closer together and then to a release position where the release mechanism moves the plates apart releasing the cracked nuts; the apparatus including a nut feed mechanism for a timed feed of nuts between the plates of the cracking machine.

14 Claims, 5 Drawing Sheets

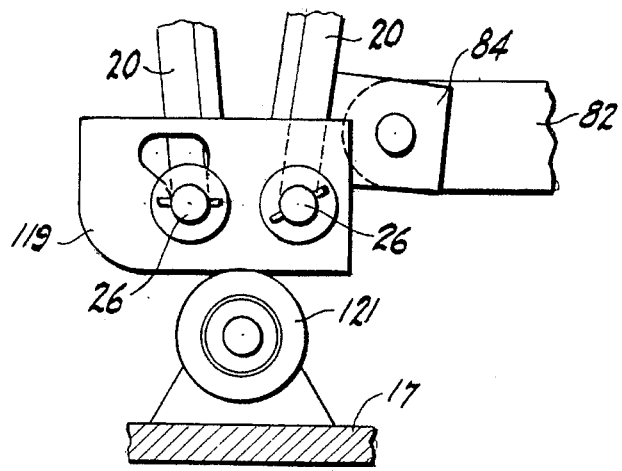
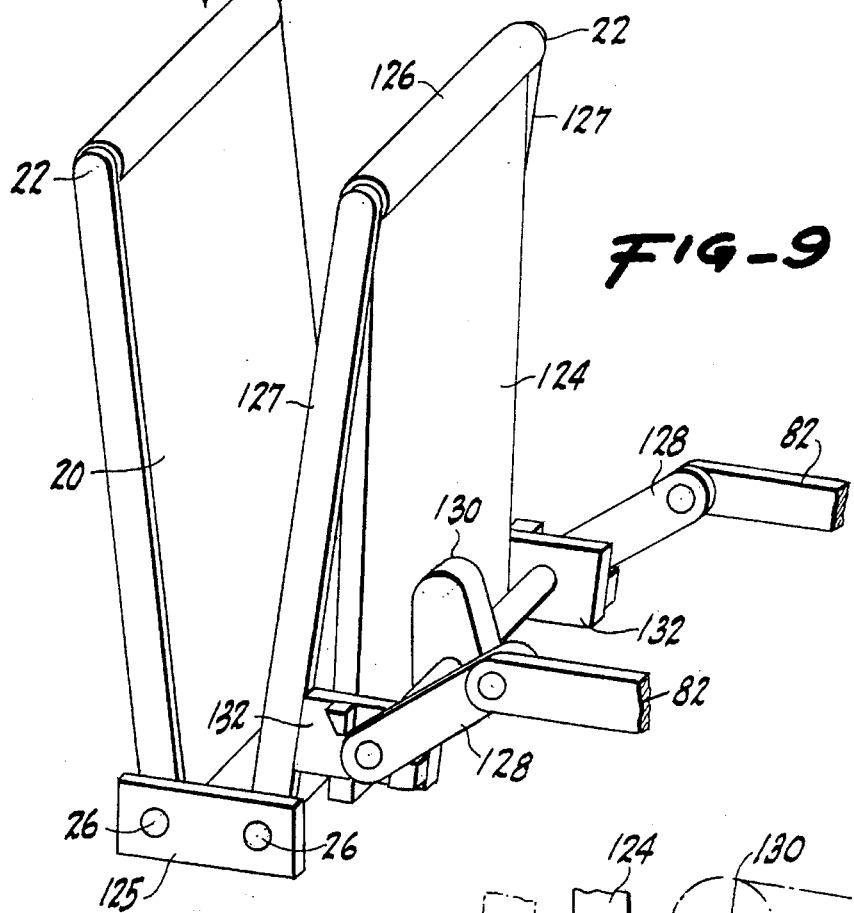
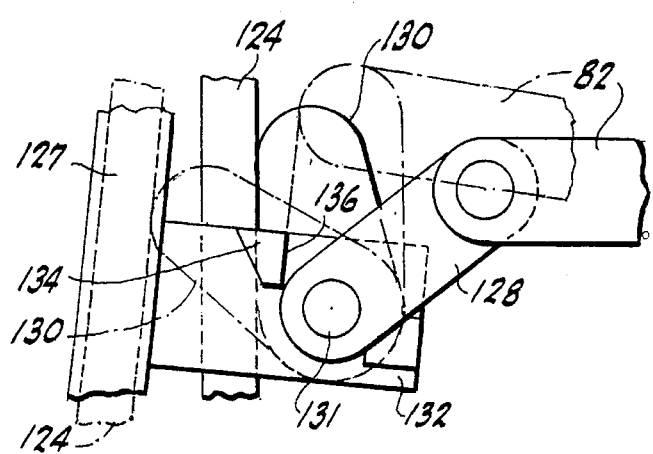

NUT CRACKING APPARATUS

BACKGROUND OF THE INVENTION

This invention relates to nut cracking apparatus and in particular to a machine for cracking nuts of different size in a cyclical operation. The apparatus includes a feed mechanism for metering the supply of nuts to the cracking machine during each cycle of operation.

The nut cracking apparatus of this invention relates to the Nut Shelling Machine, U.S. Pat. No. 5,115,733, issued May 26, 1992, the Nut Shelling Machine, U.S. Pat. No. 4,793,248, issued Dec. 27, 1988 and the Nut Cracking Machine, U.S. Pat. No. 5,247,879, issued Sep. 28, 1993. Each of the prior art machines was primarily directed to cracking the difficult macadamia nut which has a thick shell and varies in size. The feed mechanism of U.S. Pat. No. 4,793,248 that meters the feeding of nuts to the cracking machine and the vibratory feed mechanism of U.S. Pat. No. 5,115,733 that queues the nuts are combined in the feed mechanism of this invention. The primary novelty and uniqueness, however, resides in the cracking machine which differs substantially from those of the cited prior art references.

It has been found that to crack the difficult macadamia nut with minimal damage to the kernel both a compressive force and a shear force is required. The various mechanisms that have been devised to accomplish this effect have been relatively complex and require continuous adjustment to accommodate nuts of different size. A maximum product value can be obtained from the cracked nut where the nut remains whole and suffers minimal damage during the cracking process. It is speculated that the shear action provides a slight roll to the nut and capitalizes on local fracture zones that permit cracking with minimal force. Power requirements to operate the cracking machine and the potential for crushing the kernel are substantially reduced by the dynamic effect of combining direct force with a shear component.

The nut cracking apparatus of this invention may be used for a variety of other nuts and the use of the macadamia nut is primarily used to demonstrate the efficiency of the machine with an appropriate exemplar nut. However, it is to be understood that the macadamia is one of the most difficult of all nuts to shell and commands a substantial premium for minimally damaged kernels.

SUMMARY OF THE INVENTION

The nut cracking apparatus of this invention utilizes a shelling machine that relies on the shear action of oblique cracking plates that are pivotally suspended for a pendulum-like motion. The cracking apparatus includes a feed mechanism that has a vibratory component to deliver multiple queues of in-line nuts to a rotating metering device for timed deposit of nuts into the cracking machine. The cracking plates are actuated in unison by a high-torque, gear motor connected to a crank drive linked to the cracking plates. The cracking plates are suspended from the parallel pivot shafts with oblique cracking faces and with interconnected discharge ends. In this manner, nuts that are deposited between the cracking faces drop to the point that each nut contacts both faces according to its size before the cracking operation commences. The cracking plates are forced to swing in pendulum fashion by force of the drive crank and cause the displaced plates to come closer together compressing the nuts therebetween. Although the preferred embodiment shows six nuts being cracked during each cycle, it is to be understood that the feed mechanism and the cracking machine can be designed to handle a substantially greater quantity of concurrently deposited nuts during each stroke.

BRIEF DESCRIPTION OF THE DRAWINGS

FIG. 4 is an enlarged, cross-sectional top view, of the release mechanism taken on the lines 4—4 in FIG. 2.

FIG. 8 is a partial cross-sectional view of an alternate cam and plate arrangement for the release mechanism of FIG. 5.

FIG. 9 is a partial schematic view of an alternate release mechanism.

FIG. 10 is an enlarged side view of the release mechanism of FIG. 9.

DETAILED DESCRIPTION OF THE PREFERRED EMBODIMENTS

Figure 1:
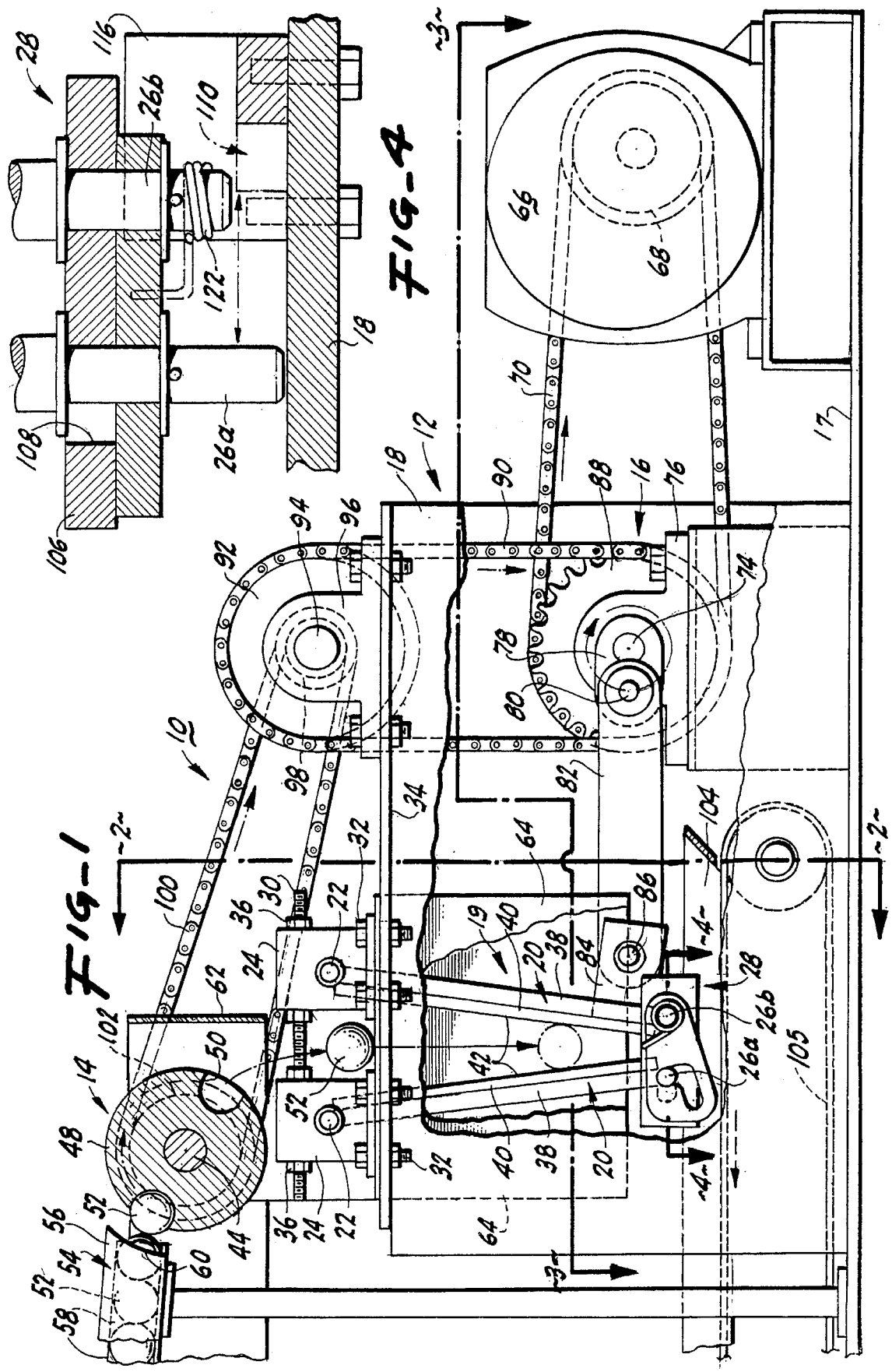
FIG. 1 is a side elevational view, partially broken away, of the nut cracking apparatus of this invention.
Figure 2:
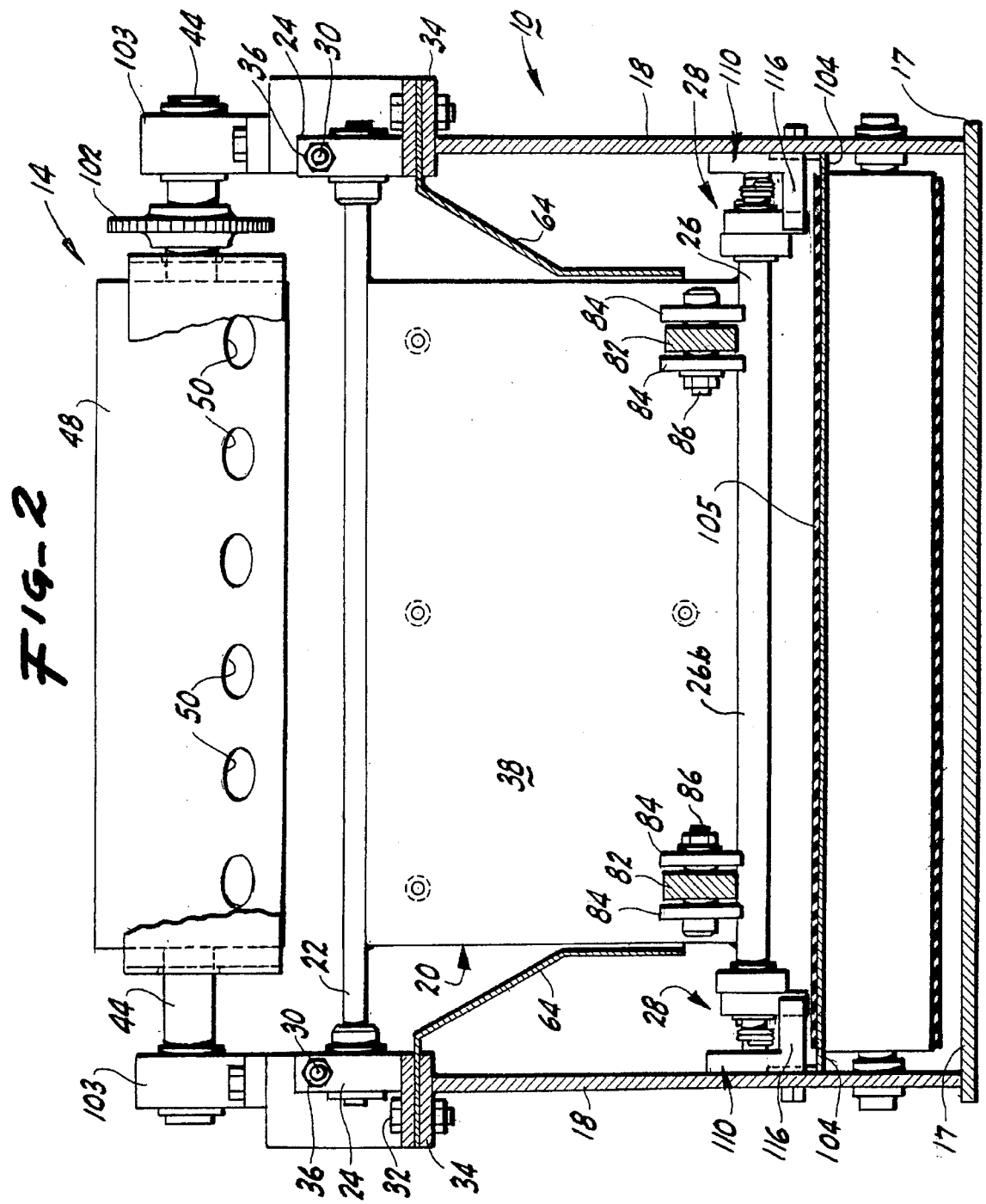
FIG. 2 is a cross-sectional, elevational view of the nut cracking apparatus of FIG. 1, taken on the lines 2—2 in FIG. 1.
Figure 3:
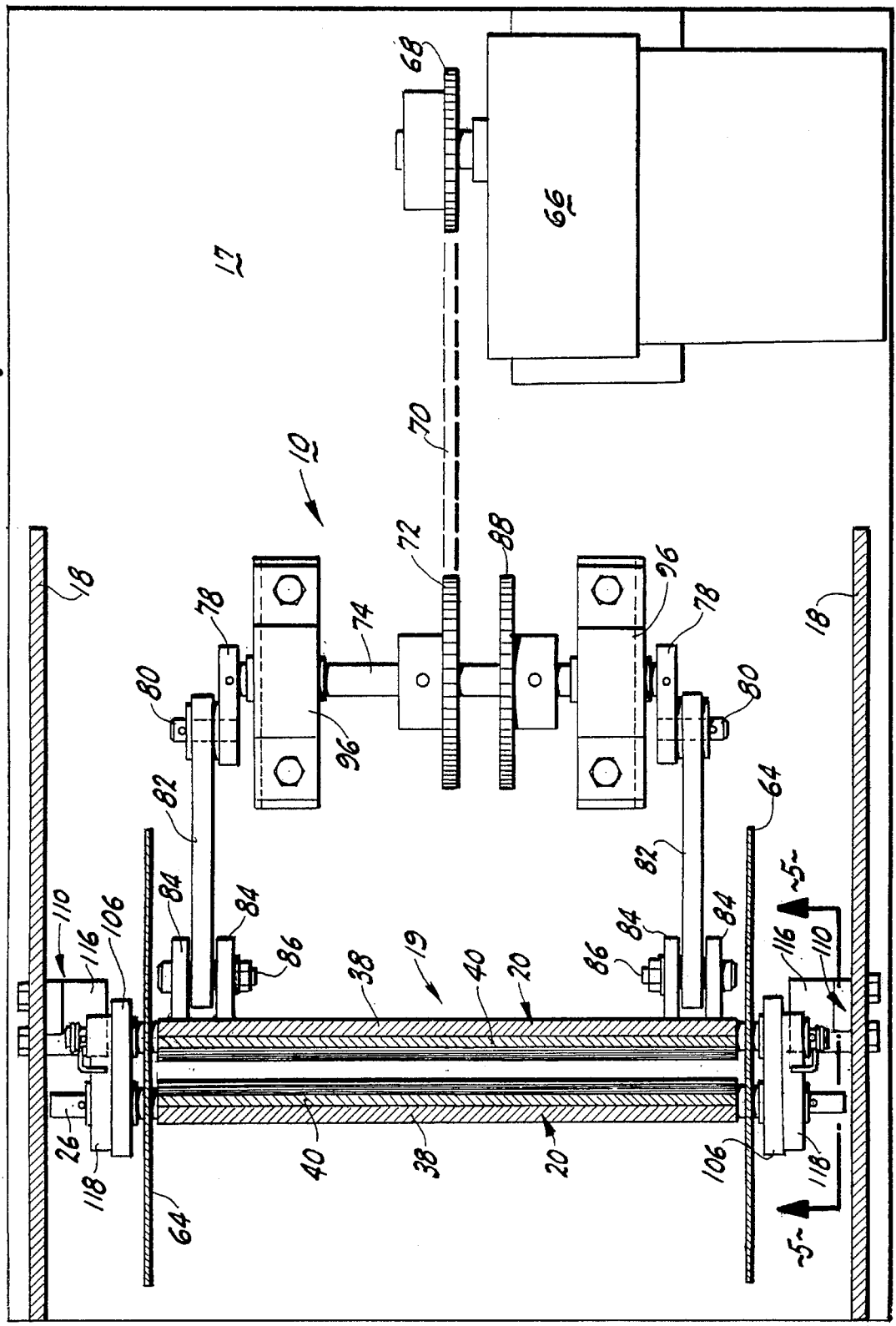
FIG. 3 is a cross sectional top view of the nut cracking apparatus taken on the lines 3—3 in FIG. 1.

Referring to FIGS. 1–3, the nut cracking apparatus is designated generally by the reference numeral 10. The apparatus 10 includes three primary components, a cracking machine 12, a feed mechanism 14 and a drive mechanism 16. The components may be mounted to a common base platform 17 for maintaining stability and alignment. The base platform 17 has side walls 18, to provide an elevated support for a cracking mechanism 19 that includes a pair of obliquely mounted cracking plates 20 shown in the cut away portion of FIG. 1. The base platform 17 and side walls 18 form an open housing for the cracking mechanism 19 of the cracking machine 12.

The cracking plates 20 are each supported at an upper end from a shaft 22 mounted in separate bearing blocks 24. The depending ends of the cracking plates 20 each have a shaft 26 fixed to each plate 20 with opposing ends of the shafts 26 interconnected by a rectangular link unit 28. The upper shafts 22 and the lower shafts 26 are oriented parallel with the spacing between the upper shafts 22 greater than the spacing between the lower shafts 26. In this manner, the plates are obliquely positioned to receive nuts therebetween. The spacing between the cracking plates 20 can be adjusted by a screw 30 that interconnects the bearing blocks 24. On loosening of machine screws 32 that mount the bearing blocks 24 to a top sill plate 34 on the side walls 18 in the cracking apparatus 10, the screws 30 allow adjustment of the spacing between the bearing blocks. Because substantial pressure is applied to the cracking plates 20, the adjustment screws 30 are secured by locking nuts 36. Adjustment of the spacing permits the cracking machine 12 to be optimized for a particular type or size of nut.

The cracking plates 20 are fabricated with a backing plate 38 of material that is easily welded to the shafts 22 and 26 and a face plate 40 that can be fabricated from hardened steel, or a hard stainless steel. The face plate 40 may include a special surface facing 42 designed for the particular nut being cracked. For example, the face plate 40 may have a surface facing 42 that is knurled to prevent slippage or contain horizontal ridges to improve the shear action on compressing the nut. Easily cracked nuts may use a smooth, easily-cleaned, surface facing 42 on the face plate 40.

The feed mechanism 14 is mounted above the cracking machine 12 and includes an axel 44 for a rotating metering drum 48 having a series of opposed pockets 50 into which a nut 52 is deposited by a vibratory feed chute 54. It is to be understood that the feed mechanism 14 may preferably be arranged on the base platform 17 with the feed mechanism feeding from opposite direction to provide a more compact unit. The arrangement shown, provides for clarity, and allows nuts to be supplied to and retrieved from the nut cracking apparatus from a common direction. Referring to the end view of the apparatus 10 shown in FIG. 2, the feed drum can include multiple series of pockets 50, here shown as six in number. It is to be understood that the width of the cracking apparatus can be varied with a corresponding increase or decrease in the number of nuts cracked per cycle. The vibratory feed chute 54 shown in part in FIG. 1 comprises a tray with side walls 56 and a number of dividers 58 to provide a number of nut queues that correspond to the number of pockets 50 in the drum 48. In operation, nuts from a hopper (not shown) are deposited on the end of the vibratory feed chute 54 and queue to a discharge end 60 where the end nut seats against the surface of the drum 48 until a pocket 50 is rotated into position. Upon seating of the nuts 52 in the pockets 50 and rotation of the drum, the pockets move to a discharge position and the drum 48 drops the nuts as shown in FIG. 1 between the cracking plates 20. A stop 62 guides the nuts discharged from the drum 48, and a shroud 64 adjacent the side ends of the cracking plates 20 ensures that the nuts are retained between the plates during the cracking process.

Timing of the rotation of the metering drum 48 and the articulation of the cracking plates 20 is accomplished by the drive mechanism 16. The drive mechanism 16 includes a drive motor 66 that is preferably a high torque, variable-speed gear motor with a sprocket 68 that engages a roller chain 70 connected to a crank sprocket 72 on an axel 74 supported in bearing blocks 76. Also mounted on the axel 74 are cranks 78 that are connected by pins 80 to connecting links 82 that in turn are connected to brackets 84 mounted to one of the cracking plates 20, as shown in FIGS. 1 and 3. The connecting links 82 are secured to the brackets 84 by a shoulder bolt 86 that functions as a pivot pin. In operation, rotation of the axel 74 will result in reciprocation of the connecting links 82 at the bracket 84 thereby swinging the interconnected cracking plates 20 in a reciprocal, pendulum motion. When this pendulum motion is applied to the two cracking plates, the effective distance between the plates is reduced from the spacing shown in FIG. 1, and the nuts that are initially wedged between the plates become compressed and cracked as the plates are displaced in unison.

In order to effect the timing of the deposit of nuts between the plates with the actuation of the plates, the crank axel 74 also includes a drive sprocket 88 with a roller chain 90 connected to a sprocket 92 upon an axel 94 in bearing blocks 96 on the sill plate 34 for driving the metering drum 48. The axel 94 includes a reduced diameter sprocket 98, shown in dotted line, with a roller chain 100 to drive a sprocket 102 or axel 44 mounted on bearing blocks 103, shown in FIG. 2, at the end of the metering drum 48. In this manner, for each cycle of reciprocation of the cracking plates 20, the metering drum undergoes a one half revolution. The chain drive is timed to drop nuts between the plates 20 when at the bottom of their swing as shown in FIG. 1. By proper reduction on the sprocket, and timing with the cracking cycle, an increased number of nut pockets 50 may be arranged around the drum 48.

Referring now to the detail view of the interconnecting link unit 28, as shown in FIGS. 4–7, the link unit 28 is a slip-link mechanism to enable the plates to separate after crushing the nuts in order to allow the shelled nuts to fall to a collection hopper 104 below the cracking plates 20. It is to be understood that the collection hopper 104 will include a tray or preferably the end of a continuous belt 105 for retrieving the shells and kernels for further processing, conventionally the separation of nuts from shells. The link unit 28 is constructed with a pair of link plates 106 having an elongated slot 108 for the trailing shaft 26a which is slightly longer than the leading shaft 26b.

Figure 5:
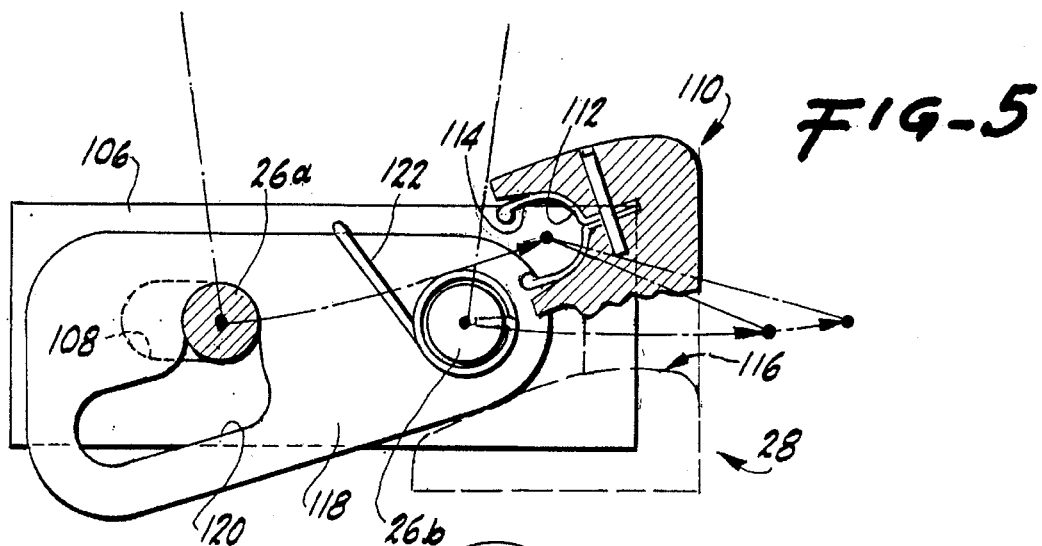
FIG. 5 is an enlarged cross-sectional side view of the release mechanism taken on the lines 5—5 in FIG. 3.
Figure 6:
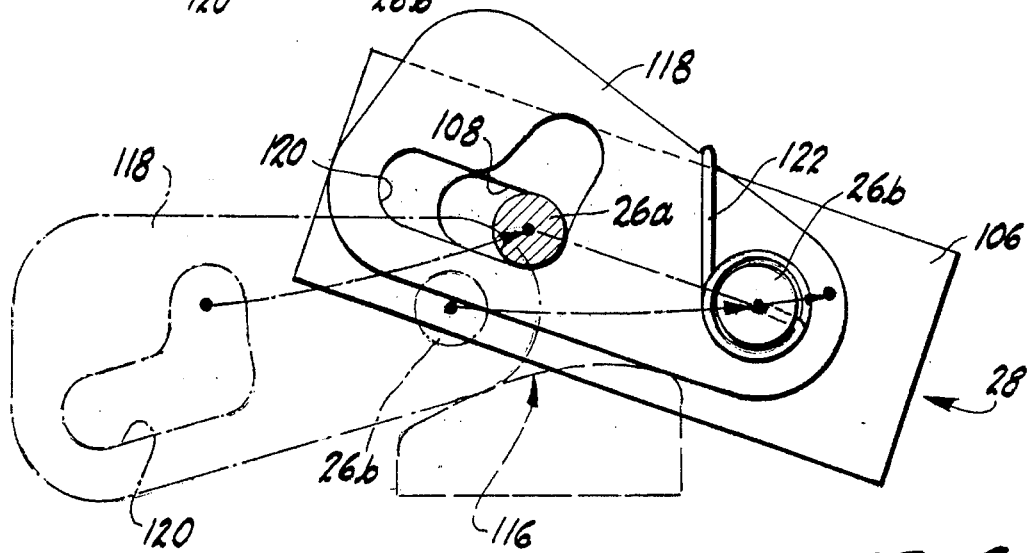
FIG. 6 is a partial cross-sectional view of the release mechanism of FIG. 5 in a displaced position.
Figure 7:
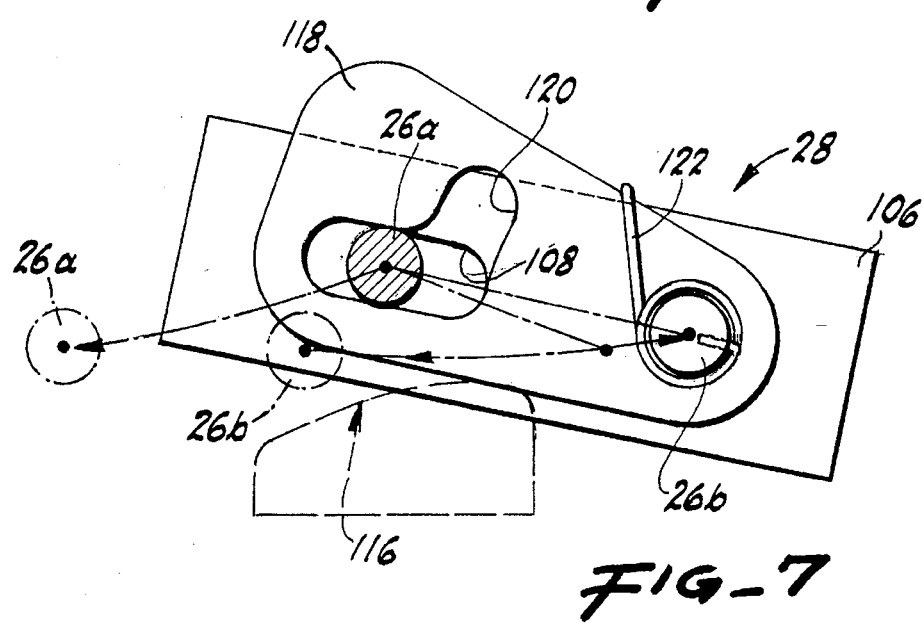
FIG. 7 is a partial cross-sectional view of the release mechanism of FIGS. 5 and 6 in a further displaced position.

When a series of nuts are deposited between the cracking plates 20 at the phase of the crank stroke as shown in FIG. 1, the nuts are crushed first as the crank 78 pulls the cracking plates toward the drive mechanism 16. Just before reaching the end of the draw stroke, the trailing shaft 26a engages a stop 110 mounted to the inside of the side walls 18. The stop 110 has a cradle 112 with a spring clip 114 to engage and releasibly retain the shaft 26a. The stop 110 also includes a cam 116 which engages a pivotal latching plate 118 having an angled shaft slot 120 which during the process of engagement of the shaft 26a in the stop cradle 112 pivots the plate 118 to enable the end of the shaft 26a to shift to the opposite end of the angled slot 120 as shown in FIGS. 5–7. In this manner, at the end of the stroke of the crank 78, the plates 106 and 118 separate a fixed distance to enable the crushed nuts and shells to drop to the collection hopper 104. As the return stroke commences, the clip 114 momentarily retains the shaft 26a in place as the shaft 26a moves to the opposite end of the elongated slot 108 to the position shown in FIG. 6. Simultaneously, a spring 122 pivots the latching plate 118 as the plates moves off of the cam 116 during the return stroke. The latching plate 118 retains the cracking plates in their spaced cracking position during the return stroke and the cracking stroke. When the latching plate is repositioned as shown in FIG. 5, the cracking plates 20 are unable to part during the cracking operation.

While the cracking mechanism is designed to crack nuts of varying size, when different nuts of substantially different size are to be cracked, the link plates 106 are replaced with link plates having a different spacing between the shaft engaging holes. For example, a cracking machine set up to crack macadamia nuts will be adjusted to crack the smaller filbert nut by moving the bearing blocks supporting the upper shafts closer together, and replacing the link plates with plates having holes (slip slots) closer together.

Alternately, a single slip-link 119, as shown in FIG. 8 with a roller 121 mounted to the base platform 117 may be used as a simplified release mechanism on the shafts 26. Here the roller 121 forces the slip-link into the appropriate position for cracking and the link moves by gravity into the release position.

It is to be understood that certain modifications to the invention can be made, including modifications to the key component of the cracking mechanism. For example, referring to FIG. 9, a modified cracking mechanism 123 is shown in a schematic illustration. In this embodiment, the cracking operation occurs only on the push stroke of the crank link 82 of the drive mechanism 16 shown in part in FIGS. 6 and 7.

One cracking plate 20 is connected to the shafts 22 and 26 in an identical manner as previously described. A conventional link 125 interconnects the ends of the lower shafts 26. The opposite cracking plate 124 is freely suspended from shaft 22 on sleeve 126 between two side struts 127. The connecting link 82 connects to a cam crank arm 128 rigidly connected to an elongated cam 130 with journal ends 131 supported in journal brackets 132 mounted to the struts 127 as shown in FIG. 10. The crank arm 128 has stops 134 which contact stops 136 on the tab-like brackets 132. The stops limit the motion of the crank arm 128 and hence the rotation of the cam 130 during reciprocation of the connecting link 82. In operation during the push stroke, the cam 130 is rotated counter-clockwise to swing the cracking plate 124 between the struts 126, at the beginning of the stroke. As the stroke proceeds, both cracking plates 20 and 124 swing on the axis of the shafts 22 bringing the plates closer together and compressing any nuts located therebetween. As the return stroke begins, the cranks arms 128 are returned to the position shown in FIGS. 9 and 10 further opening the gap between the plates and allowing nuts to fall therebetween. The deposit of nuts from a metering device (not shown) is timed to occur after the plate 124 has moved to its cracking position in alignment with the struts 126. In this manner, the nuts will fall to the position that both plates contact the nut therebetween allowing further compression and shear to crack the nut in the manner previously described.

In operation, the cracking mechanism 123 of FIGS. 9 and 10 with the cam displaced plate operates in the same manner as the cracking mechanism 14 of FIG. 1 with the latching device for allowing discharge of cracked nuts.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A nut cracking machine comprising:

first and second opposed cracking plates with pivot means for suspending one of the plates from a pivot axis substantially parallel to and spaced from the pivot axis of the other plate, wherein the two plates have upper ends proximate the pivot means and lower ends depending from the pivot means;

interconnecting link means for interconnecting the plates, wherein the plates are moveable in unison, wherein the interconnecting link means interconnects the plates with a spacing between the plates at the upper ends that is greater than the spacing between the plates at the lower ends; and reciprocation means for displacing the plates in unison from a first position, where nuts are deposited between the plates, to a second position where nuts deposited between the plates are compressed and cracked.

2. The nut cracking machine of claim 1 wherein the interconnecting link means includes release means, wherein the reciprocation means displaces the plates in unison to a third position where at least one of the plates is further displaced from the other plate, wherein cracked nuts are released.

3. The nut cracking machine of claim 1 wherein the interconnecting link means interconnects the plates at the lower ends of the plates.

4. The nut cracking machine of claim 2 wherein the interconnecting link means interconnects the plates at the lower ends of the plates.

5. The nut cracking machine of claim 4 wherein the release means includes a cam operated latch mechanism.

6. The nut cracking machine of claim 5 comprising further, a housing having support means for supporting the cracking plates by the pivot means.

7. The nut cracking machine of claim 6 wherein the release means includes a cam means mounted to the housing for engaging the latch mechanism of the release means for enabling further displacement of one plate from the other.

8. The nut cracking machine of claim 1 wherein the reciprocation means comprises a drive motor with a crank and a connecting link connected to one of the cracking plates.

9. The nut cracking machine of claim 8 in combination with a nut feed mechanism, the nut feed mechanism having means for periodically feeding nuts between the cracking plates.

10. The nut cracking machine of claim 9 wherein the nut feed mechanism has a feed cycle and the reciprocation means has a cracking cycle and the feed cycle is timed with the cracking cycle to deposit nuts between the cracking plates at the optimum time in the cracking cycle.

11. The nut cracking machine of claim 1 wherein the housing has a base platform and side plates, wherein the cracking plates are supported by the side plates.

12. The nut cracking machine of claim 11 wherein the upper ends of the plates have a shaft and the side plates are spaced apart in a pair, each plate having first and second spaced bearing blocks, wherein the shaft of each plate has ends, the ends engageable in the bearing blocks for pivot of the plates, with the shafts of the plates, each having an axis with the axis being substantially parallel.

13. The nut cracking machine of claim 11 wherein the position of the bearing blocks on the plates are adjustable, wherein the spacing between the upper ends of the plates is adjustable for accommodating nuts of substantially different size.

14. The nut cracking machine of claim 11 wherein the interconnecting link means comprises a pair of replaceable links of defined size that are replaceable by a pair of links of different size.

* * * * *